US012750857B2

(12) United States Patent
Zhu et al.

(10) Patent No.: US 12,750,857 B2
(45) Date of Patent: Sep. 29, 2026

(54) CHANNEL STATE INFORMATION REPORT CONFIGURATION

(71) Applicant: LENOVO (BEIJING) LIMITED, Beijing (CN)

(72) Inventors: Chenxi Zhu, Beijing (CN); Bingchao Liu, Beijing (CN); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 979 days.

(21) Appl. No.: 17/911,232

(22) PCT Filed: Mar. 13, 2020

(86) PCT No.: PCT/CN2020/079194

§ 371 (c)(1),
(2) Date: Sep. 13, 2022

(87) PCT Pub. No.: WO2021/179285

PCT Pub. Date: Sep. 16, 2021

(65) Prior Publication Data

US 2023/0112922 A1 Apr. 13, 2023

(51) Int. Cl.
*H04W 24/10* (2009.01)
*H04W 72/231* (2023.01)

(52) U.S. Cl.
CPC ......... *H04W 72/231* (2023.01); *H04W 24/10* (2013.01)

(58) Field of Classification Search
CPC ............................ H04W 72/231; H04W 24/10
USPC ........................................................... 370/329
See application file for complete search history.

(56) References Cited

U.S. PATENT DOCUMENTS

| | | | | |
|---|---|---|---|---|
| 2019/0109679 | A1 | 4/2019 | Liu et al. | |
| 2021/0028843 | A1* | 1/2021 | Zhou | H04B 7/063 |
| 2022/0053359 | A1* | 2/2022 | Song | H04W 24/10 |
| 2022/0247467 | A1* | 8/2022 | Huang | H04W 72/23 |

FOREIGN PATENT DOCUMENTS

| | | | |
|---|---|---|---|
| CN | 109891772 | A | 6/2019 |
| CN | 109937599 | A | 6/2019 |
| WO | 2019157761 | A1 | 8/2019 |

OTHER PUBLICATIONS

International Searching Authority, "Written Opinion of the International Searching Authority," PCT/CN2020/079194, Dec. 7, 2020, pp. 1-3.
OPPO, Remaining Issues on Multi-beam Operation Enhancement, 3GPP TSG RAN WG1 #100, R1-20000458, Feb. 24-Mar. 6, 2020, pp. 1-8, e-Meeting.

* cited by examiner

*Primary Examiner* — Christopher R Crompton
(74) *Attorney, Agent, or Firm* — Kunzler Needham & Hilton

(57) ABSTRACT

Apparatuses, methods, and systems are disclosed for channel state information report configuration. One method (600) includes transmitting (602) a medium access control control element message corresponding to a channel state information report configuration, wherein the medium access control control element message comprises: a channel state information report configuration identifier; and a channel state information resource configuration identifier for channel measurement.

16 Claims, 7 Drawing Sheets

CHANNEL STATE INFORMATION REPORT CONFIGURATION

FIELD

The subject matter disclosed herein relates generally to wireless communications and more particularly relates to channel state information report configuration.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Aperiodic ("AP"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Remote Radio Head ("RRH"), Reference Signal ("RS"), Reference Signal Received Power ("RSRP"), Reference Signal Received Quality ("RSRQ"), Receive ("RX"), Single Carrier Frequency Domain Spread Spectrum ("SC-FDSS"), Secondary Cell ("SCell"), Sub Carrier Spacing ("SCS"), Single DCI ("S-DCI"), Spatial Division Multiplexing ("SDM"), Service Data Unit ("SDU"), Single Frequency Network ("SFN"), Subscriber Identity Module ("SIM"), Signal-to-Interference Ratio ("SINR"), Sidelink ("SL"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indication ("TCI"), Time Division Duplex ("TDD"), Temporary Mobile Subscriber Identity ("TMSI"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, UEs may travel across a geographical region.

BRIEF SUMMARY

Methods for channel state information report configuration are disclosed. Apparatuses and systems also perform the functions of the methods. In one embodiment, the method includes transmitting a medium access control control element message corresponding to a channel state information report configuration, wherein the medium access control control element message comprises: a channel state information report configuration identifier; and a channel state information resource configuration identifier for channel measurement.

An apparatus for channel state information report configuration, in one embodiment, includes a transmitter that transmits a medium access control control element message corresponding to a channel state information report configuration, wherein the medium access control control element message comprises: a channel state information report configuration identifier; and a channel state information resource configuration identifier for channel measurement.

A method for channel state information report configuration includes receiving a medium access control control element message corresponding to a channel state information report configuration, wherein the medium access control control element message comprises: a channel state information report configuration identifier; and a channel state information resource configuration identifier for channel measurement.

An apparatus for channel state information report configuration, in one embodiment, includes a receiver that receives a medium access control control element message corresponding to a channel state information report configuration, wherein the medium access control control element message comprises: a channel state information report configuration identifier; and a channel state information resource configuration identifier for channel measurement.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a schematic block diagram illustrating another embodiment of a system including communications with a;

DETAILED DESCRIPTION

Figure 1:
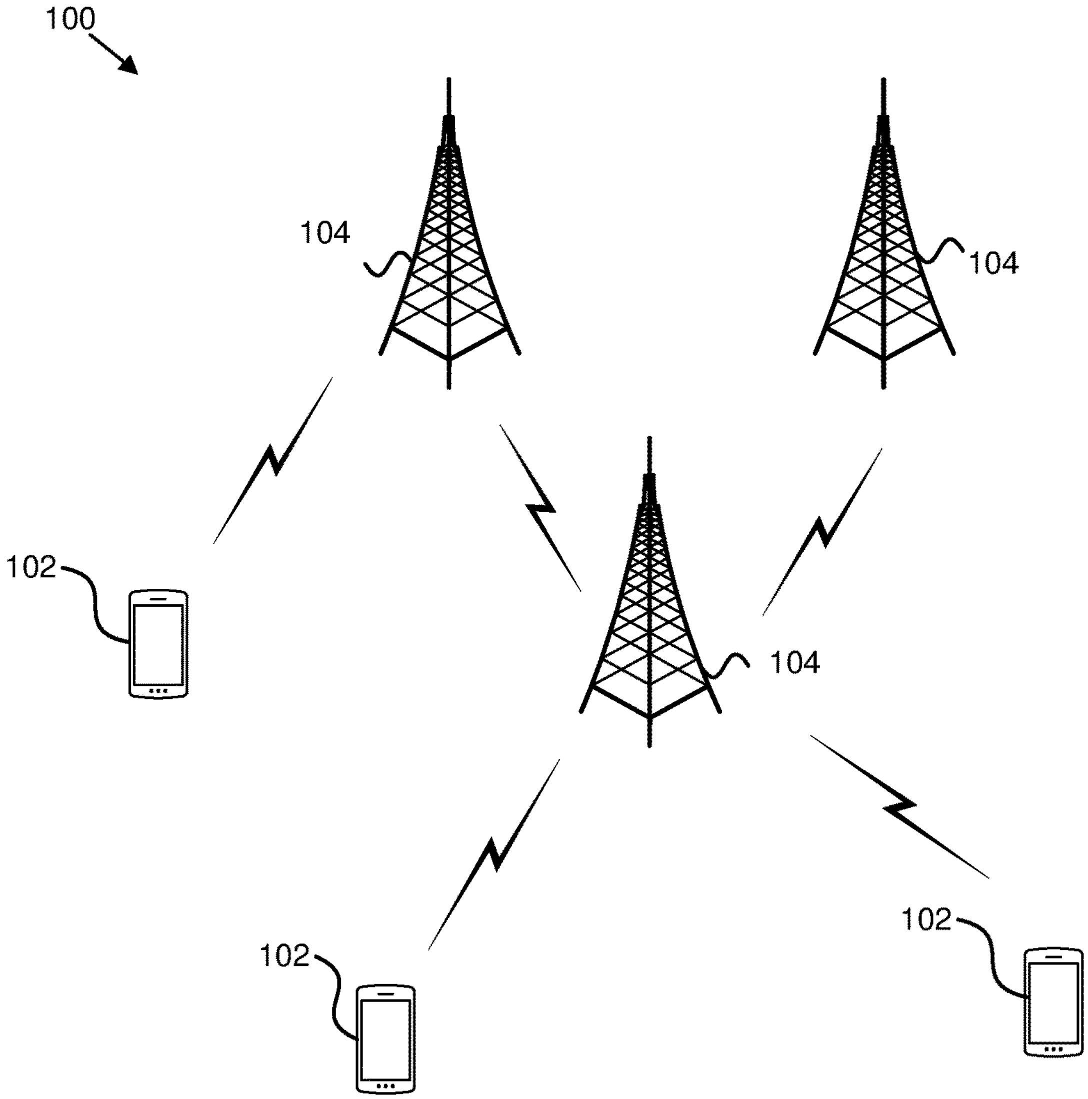
FIG. 1 is a schematic block diagram illustrating one embodiment of a wireless communication system for channel state information report configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for channel state information report configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In some embodiments, a network unit 104 may transmit a medium access control control element message corresponding to a channel state information report configuration, wherein the medium access control control element message comprises: a channel state information report configuration identifier; and a channel state information resource configuration identifier for channel measurement. Accordingly, a network unit 104 may be used for channel state information report configuration.

In various embodiments, a remote unit 102 may receive a medium access control control element message corresponding to a channel state information report configuration, wherein the medium access control control element message comprises: a channel state information report configuration identifier; and a channel state information resource configuration identifier for channel measurement. Accordingly, a remote unit 102 may be used for channel state information report configuration.

Figure 2:
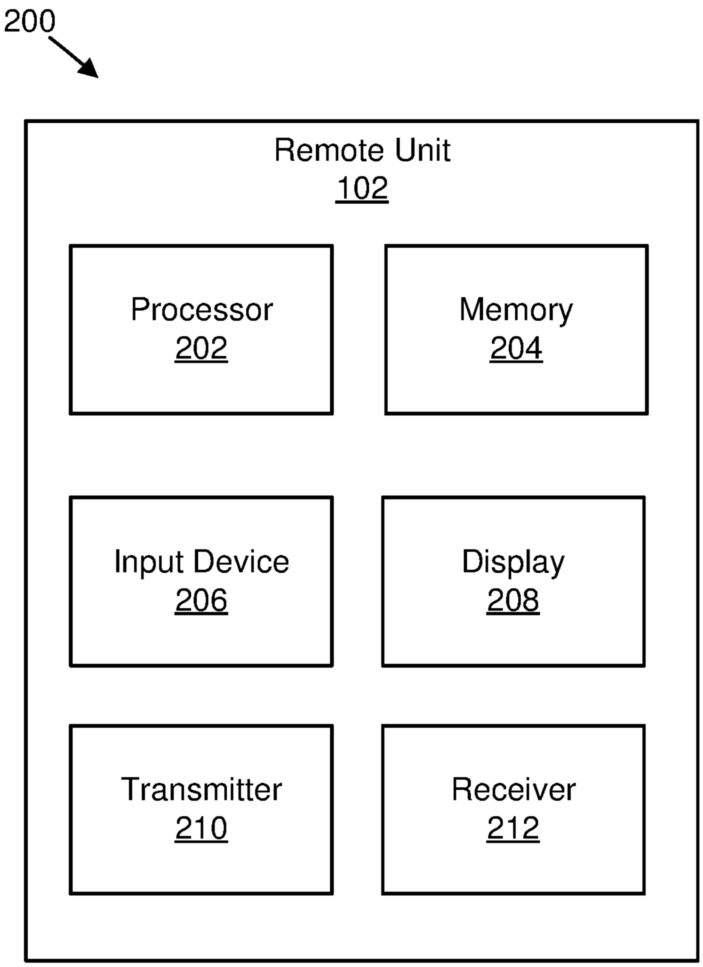
FIG. 2 is a schematic block diagram illustrating one embodiment of an apparatus that may be used for channel state information report configuration.

FIG. 2 depicts one embodiment of an apparatus 200 that may be used for channel state information report configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the receiver 212 may receive a medium access control control element message corresponding to a channel state information report configuration, wherein the medium access control control element message comprises: a channel state information report configuration identifier; and a channel state information resource configuration identifier for channel measurement. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
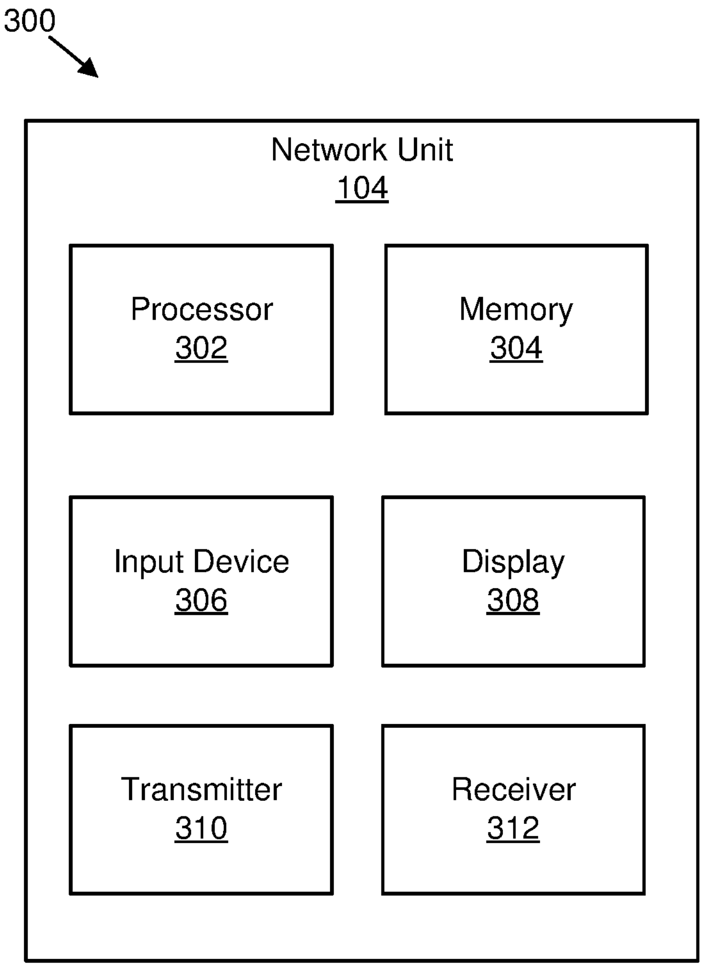
FIG. 3 is a schematic block diagram illustrating one embodiment of an apparatus that may be used for channel state information report configuration.

FIG. 3 depicts one embodiment of an apparatus 300 that may be used for channel state information report configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmit a medium access control control element message corresponding to a channel state information report configuration, wherein the medium access control control element message comprises: a channel state information report configuration identifier; and a channel state information resource configuration identifier for channel measurement. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
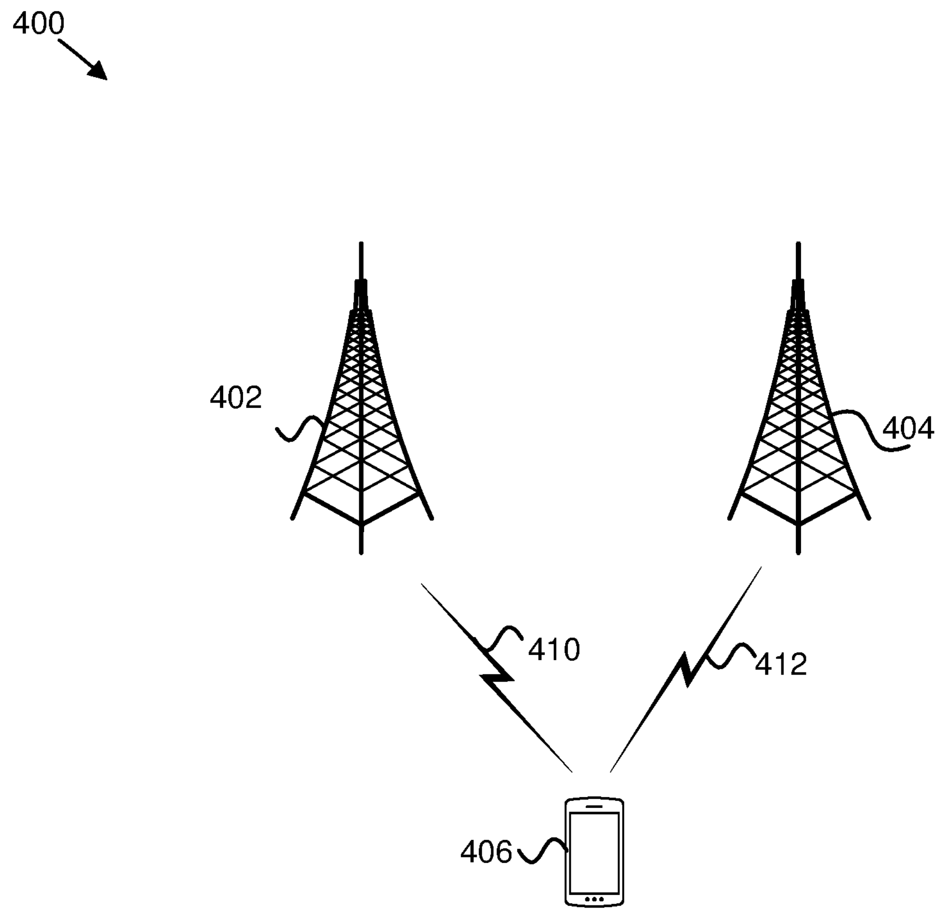
FIG. 4 is a schematic block diagram illustrating one embodiment of a system including communications with a UE.

FIG. 4 is a schematic block diagram illustrating one embodiment of a system 400 including communications with a UE. The system 400 (e.g., a cell) includes a first RRH 402 (e.g., TRP) and a second RRH 404 (e.g., TRP) that communicate with a UE 406. The first RRH 402 and the second RRH 404 are deployed along a path (e.g., railway line). In some embodiments, the first RRH 402 and the second RRH 404 share the same cell ID. In various embodiments, the first RRH 402 and the second RRH 404 are connected to a gNB with an ideal backhaul and may jointly transmit DL data to the UE 406 in PDSCH. Specifically, the first RRH 402 uses a first communication channel 410 (e.g., one or more communication channels) and the second RRH 404 uses a second communication channel 412 (e.g., one or more communication channels).

Figure 5:
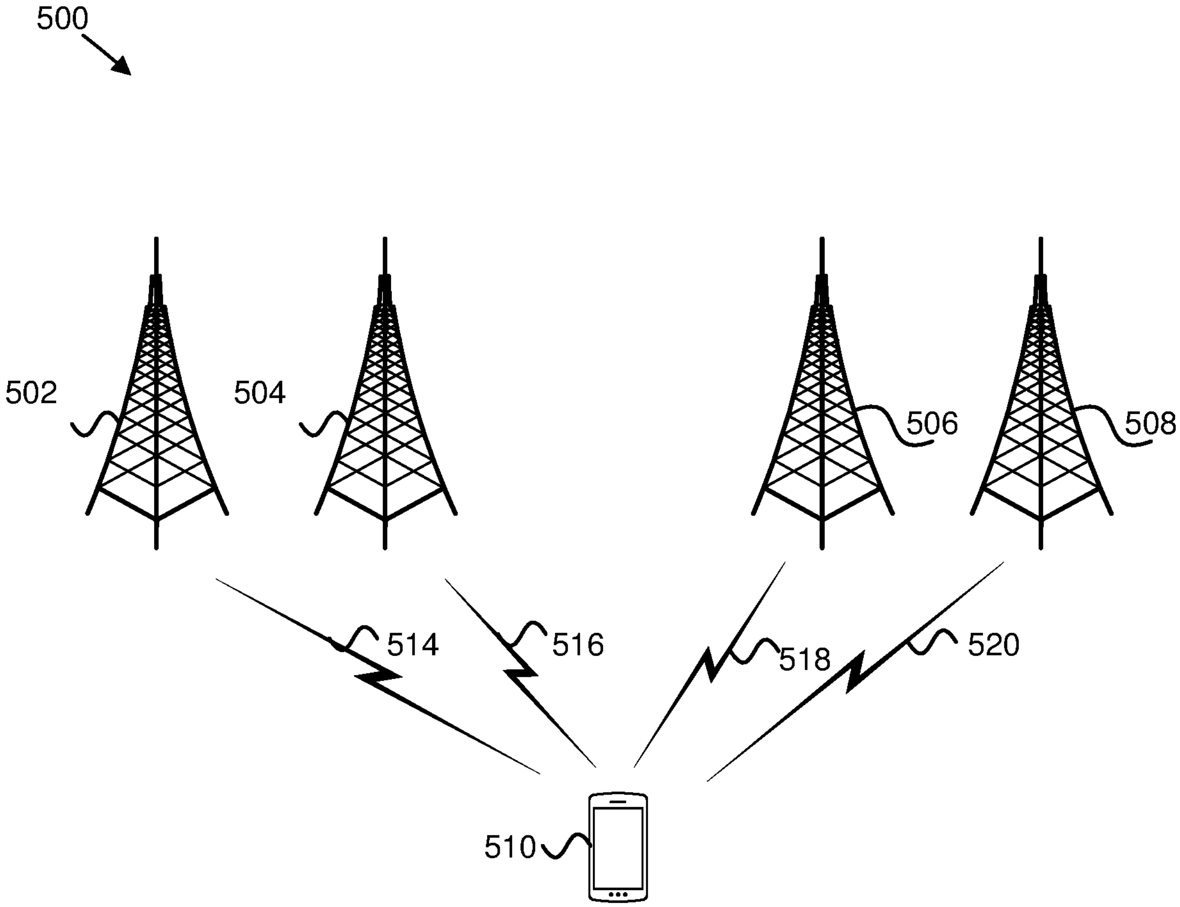

FIG. 5 is a schematic block diagram illustrating another embodiment of a system 500 including communications with a UE. The system 500 (e.g., a cell) includes a first RRH 502 (e.g., TRP), a second RRH 504 (e.g., TRP), a third RRH 506 (e.g., TRP), and a fourth RRH 508 (e.g., TRP) that communicate with a UE 510. The first RRH 502, the second RRH 504, the third RRH 506, and the fourth RRH 508 are deployed along a path (e.g., railway line). The first RRH 502 uses a first communication channel 514 (e.g., one or more communication channels) to transmit CSI-RS (e.g., CSI-RS1) in a first CSI-RS resource, the second RRH 504 uses a second communication channel 516 (e.g., one or more communication channels) to transmit CSI-RS (e.g., CSI-RS2) in a second CSI-RS resource, the third RRH 506 uses a third communication channel 518 (e.g., one or more communication channels) to transmit CSI-RS (e.g., CSI-RS3) in a third CSI-RS resource, and the fourth RRH 508 uses a fourth communication channel 520 (e.g., one or more communication channels) to transmit CSI-RS (e.g., CSI-RS4) in a fourth CSI-RS resource. The different RRHs transmit different CSI-RS in different CSI-RS resources. Different CSI-RS resources are configured for different RRHs.

Various embodiments described herein may be used to reduce latency for CIS measurement and/or feedback for UEs.

In some embodiments, a UE may be configured by RRC with N≥1 CSI report configuration settings and/or M≥1 CSI resource configuration settings. In certain embodiments, a UE may conduct CSI measurement based on configured CSI-RS resources for channel measurement and CSI-RS resources for interference measurement. In various embodiments, a UE may report CSI feedback to a gNB periodically, semi-persistently, or aperiodically.

In some embodiments, Tables 1, 2, and 3 correspond to a CSI framework.

TABLE 1

| Channel State Information Framework |
|---|
| The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), tank indicator (RI) and/or Ll-RSRP.<br>For CQI, PMI, CRI, SSBRI, LI, RI, L1-RSRP, a UE is configured by higher layers with N ≥ 1 CSI-ReportConfig Reporting Settings, M ≥ 1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig. |

TABLE 2

| Reporting Settings |
|---|
| Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (LI), L1-RSRP, CRI, and SSBRI (SSB Resource Indicator). |

TABLE 2-continued

| Reporting Settings |
| --- |
| The time domain behavior of the CSI-ReportConfig is indicated by the higher layer parameter reportConfigType and can be set to 'aperiodic', 'semiPersistentOnPUCCH', 'semiPersistentOnPUSCH', or 'periodic'. For periodic and semiPersistentOnPUCCH/semiPersistentOnPUSCH CSI reporting, the configured periodicity and slot offset applies in the numerology of the UL BWP in which the CSI report is configured to be transmitted on. The higher layer parameter reportQuantity indicates the CSI-related or L1-RSRP-related quantities to report. The reportFreqConfiguration indicates the reporting granularity in the frequency domain, including the CSI reporting band and if PMI/CQI reporting is wideband or sub-band. The timeRestrictionForChannelMeasurements parameter in CSI-ReportConfig can be configured to enable time domain restriction for channel measurements and timeRestrictionForInterferenceMeasurements can be configured to enable time domain restriction for interference measurements. The CSI-ReportConfig can also contain CodebookConfig, which contains configuration parameters for Type-I or Type II CSI including codebook subset restriction, and configurations of group based reporting. |

TABLE 3

| Resource Settings |
| --- |
| Each CSI Resource Setting CSI-ResourceConfig contains a configuration of a list of S ≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.<br>The time domain behavior of the CSI-RS resources within a CSI Resource Setting are indicated by the higher layer parameter resourceType and can be set to aperiodic, periodic, or semi-persistent. For periodic and semi-persistent CSI Resource Settings, the number of CSI-RS Resource Sets configured is limited to S = 1. For periodic and semi-persistent CSI Resource Settings, the configured periodicity and slot offset is given in the numerology of its associated DL BWP, as given by BWP-id. When a UE is configured with multiple CSI-ResourceConfigs consisting the same NZP CSI-RS resource ID, the same time domain behavior shall be configured for the CSI-ResourceConfigs. When a UE is configured with multiple CSI-ResourceConfigs consisting the same CSI-IM resource ID, the same time-domain behavior shall be configured for the CSI-ResourceConfigs. All CSI Resource Settings linked to a CSI Report Setting shall have the same time domain behavior.<br>The following are configured via higher layer signaling for one or more CSI Resource Settings for channel and interference measurement:<br>- CSI-IM resource for interference measurement.<br>- NZP CSI-RS resource for interference measurement.<br>- NZP CSI-RS resource for channel measurement.<br>The UE may assume that the NZP CSI-RS resource(s) for channel measurement and the CSI-IM resource(s) for interference measurement configured for one CSI reporting are resource-wise QCLed with respect to 'QCL-TypeD'. When NZP CSI-RS resource(s) is used for interference measurement, the UE may assume that the NZP CSI-RS resource for channel measurement and the CSI- IM resource and/or NZP CSI-RS resource(s) for interference measurement configured for one CSI reporting are QCLed with respect to 'QCL-TypeD'. |

In certain embodiments, Tables 4, 5, 6, 7, and 8 correspond to CSI report configuration.

TABLE 4

| CSI-ReportConfig |
| --- |
| The IE CSI-ReportConfig is used to configure a periodic or semi-persistent report sent on PUCCH on the cell in which |

TABLE 4-continued

| CSI-ReportConfig |
| --- |
| the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). |

TABLE 5

CSI-ReportConfig Information Element

```
-- ASN1START
-- TAG-CSI-REPORTCONFIG-START
CSI-ReportConfig ::=                        SEQUENCE {
  reportConfigId                              CSI-ReportConfigId,
  carrier                                     ServCellIndex          OPTIONAL, -- Need S
  resourcesForChannelMeasurement              CSI-ResourceConfigId,
  csi-IM-ResourcesForInterference             CSI-ResourceConfigId   OPTIONAL, -- Need R
  nzp-CSI-RS-ResourcesForInterference         CSI-ResourceConfigId   OPTIONAL, -- Need R
  reportConfigType                            CHOICE {
    periodic                                    SEQUENCE {
                  reportSlotConfig                CSI-ReportPeriodicxtyAndOffset.
                  pucch-CSI-ResourceList          SEQUENCE (SIZE (1..maxNrofBWPs)) OF PUCCH-
CSI-Resource
```

TABLE 5-continued

CSI-ReportConfig Information Element

```
    },
    semiPersistentOnPUCCH                       SEQUENCE {
                reportSlotConfig                  CSI-ReportPeriodicityAndOffset.
                pucch-CSI-ResourceList            SEQUENCE (SIZE (1..maxNrofBWPs)) OF PUCCH-
CSI-Resource
    },
    semiPersistentOnPUSCH                       SEQUENCE {
                reportSlotConfig                  ENUMERATED {s15, s110, s120, s140, s180,
s1160, s1320},
                reportSlotOffsetList            SEQUENCE (SIZE (1.. maxNrofUL-Allocations)) OF
INTEGER(0..32),
                p0alpha                           P0-PUSCH-AlphaSetId
    },
    aperiodic                                   SEQUENCE {
                reportSlotOffsetList            SEQUENCE (SIZE (1. .maxNrofUL-Allocations) ) OF
INTEGER(0..32)
    }
  },
  reportQuantity                              CHOICE {
    none                                        NULL,
    cri-RI-PMI-CQI                              NULL,
    cri-RI-i1                                   NULL,
    cri-RI-i1-CQI                               SEQUENCE {
                pdsch-BundleSizeForCSI            ENUMERATED {n2, n4}
OPTIONAL        -- Need S
    },
    cri-RI-CQI                                  NULL,
    cri-RSRP                                    NULL,
    ssb-Index-RSRP                              NULL,
    cri-RI-LI-PMI-CQI                           NULL
  },
  reportFreqConfiguration                     SEQUENCE {
    cqi-FormatIndicator                         ENUMERATED { widebandCQI, subbandCQI }
OPTIONAL,       -- Need R
    pmi-FormatIndicator                         ENUMERATED { widebandPMI, subbandPMI }
OPTIONAL,       -- Need R
    csi-ReportingBand                           CHOICE {
                subbands3                         BIT STRING(SIZE(3)),
                subbands4                         BIT STRING(SIZE(4)),
                subbands5                         BIT STRING(SIZE(5)),
                subbands6                         BIT STRING(SIZE(6)),
                subbands7                         BIT STRING(SIZE(7)),
                subbands8                         BIT STRING(SIZE(8)),
                subbands9                         BIT STRING(SIZE(9)),
                subbands10                        BIT STRING(SIZE(10)),
                subbands11                        BIT STRING(SIZE(11)),
                subbands12                        BIT STRING(SIZE(12)),
                subbands13                        BIT STRING(SIZE(13)),
                subbands14                        BIT STRING(SIZE(14)),
                subbands15                        BIT STRING(SIZE(15)),
                subbands16                        BIT STRING(SIZE(16)),
                subbands17                        BIT STRING(SIZE(17)),
                subbands18                        BIT STRING(SIZE(18)),
                ...,
                subbands19-v1530                  BIT STRING(SIZE(19))
    }           OPTIONAL              -- Need S
  }
OPTIONAL,       -- Need R
  timeRestrictionForChannelMeasurements           ENUMERATED {configured, notConfigured},
  timeRestrictionForInterferenceMeasurements      ENUMERATED {configured, notConfigured},
  codebookConfig                                  CodebookConfig
OPTIONAL,       -- Need R
  dummy                                           ENUMERATED {n1, n2}
OPTIONAL,       -- Need R
  groupBasedBeamReporting                       CHOICE {
    enabled                                       NULL,
    disabled                                      SEQUENCE {
                nrofReportedRS                    ENUMERATED {n1, n2, n3, n4}
OPTIONAL        -- Need S
    }
  },
  cqi-Table                               ENUMERATED {table1, table2, table3, spare1}
OPTIONAL,       -- Need R
  subbandSize                             ENUMERATED {value1, value2},
  non-PMI-PortIndication                  SEQUENCE (SIZE (1..maxNrofNZP-CSI-RS-ResourcesPerConfig)) OF
PortIndexFor8Ranks OPTIONAL,             -- Need R
  ...,
  [[
```

TABLE 5-continued

CSI-ReportConfig Information Element

```
  semiPersistentOnPUSCH-v1530                 SEQUENCE {
     reportSlotConfig-v1530                      ENUMERATED {s14, s18, s116}
  }
OPTIONAL        -- Need R
  ]]
}
CSI-ReportPeriodicityAndOffset ::= CHOICE {
  slots4                                      INTEGER(0..3),
  slots5                                      INTEGER(0..4),
  slots8                                      INTEGER(0..7),
  slots10                                     INTEGER(0..9),
  slots16                                     INTEGER(0..15),
  slots20                                     INTEGER(0..19),
  slots40                                     INTEGER(0..39),
  slots80                                     INTEGER(0..79),
  slots160                                    INTEGER(0..159),
  slots320                                    INTEGER(0..319)
}
PUCCH-CSI-Resource ::=                      SEQUENCE {
  uplinkBandwidthPartId                       BWP-Id,
  pucch-Resource                              PUCCH-ResourceId
}
PortIndexFor8Ranks ::=                      CHOICE {
  portIndex8                                  SEQUENCE{
     rank1-8                                     PortIndex8
OPTIONAL,       -- Need R
     rank2-8                                     SEQUENCE(SIZE(2)) OF PortIndex8
OPTIONAL,       -- Need R
     rank3-8                                     SEQUENCE(SIZE(3)) OF PortIndex8
OPTIONAL,       -- Need R
     rank4-8                                     SEQUENCE(SIZE(4)) OF PortIndex8
OPTIONAL,       -- Need R
     rank5-8                                     SEQUENCE(SIZE(5)) OF PortIndex8
OPTIONAL,       -- Need R
     rank6-8                                     SEQUENCE(SIZE(6)) OF PortIndex8
OPTIONAL,       -- Need R
     rank7-8                                     SEQUENCE(SIZE(7)) OF PortIndex8
OPTIONAL,       -- Need R
     rank8-8                                     SEQUENCE(SIZE(8)) OF PortIndex8
OPTIONAL        -- Need R
  },
  portIndex4                                  SEQUENCE {
     rank1-4                                     PortIndex4
OPTIONAL,       -- Need R
     rank2-4                                     SEQUENCE(SIZE(2)) OF PortIndex4
OPTIONAL,       -- Need R
     rank3-4                                     SEQUENCE(SIZE(3)) OF PortIndex4
OPTIONAL,       -- Need R
     rank4-4                                     SEQUENCE(SIZE(4)) OF PortIndex4
OPTIONAL        -- Need R
  },
  portIndex2                                  SEQUENCE {
     rank1-2                                     PortIndex2
OPTIONAL,       -- Need R
     rank2-2                                     SEQUENCE(SIZE(2)) OF PortIndex2
OPTIONAL        -- Need R
  },
  portIndex1                                  NULL
}
PortIndex8::=                               INTEGER (0..7)
PortIndex4::=                               INTEGER (0..3)
Port Index2::=                              INTEGER (0..1)
-- TAG-CSI-REPORTCONFIG-STOP
-- ASN1STOP
```

TABLE 6

| CSI-ReportConfig Field Descriptions | |
|---|---|
| carrier | Indicates in which serving cell the CSI-ResourceConfig indicated below are to be found. If the field is absent, the resources are on the same serving cell as this report configuration. |
| codebookConfig | Codebook configuration for Type-1 or Type-2 including codebook subset restriction. |

TABLE 6-continued

| CSI-ReportConfig Field Descriptions | |
|---|---|
| cqi-FormatIndicator | Indicates whether the UE shall report a single (wideband) or multiple (subband) CQI. |
| cqi-Table | Which CQI table to use for CQI calculation. |
| csi-IM-ResourcesForInterference | CSI IM resources for interference measurement. csi-ResourceConfigid of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement. |
| csi-ReportingBand | Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on). This field is absent if there are less than 24 PRBs (no sub band) and present otherwise, the number of sub bands can be from 3 (24 PRBs, sub band size 8) to 18 (72 PRBs, sub band size 4). |
| dummy | This field is not used in the specification. If received it shall be ignored by the UE. |
| groupBasedBeamReporting | Turning on/off group beam based reporting. |
| non-PMI-PortIndication | Port indication for RI/CQI calculation. For each CSI-RS resource in the linked ResourceConfig for channel measurement, a port indication for each rank R, indicating which R ports to use. Applicable only for non-PMI feedback.<br>The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on. |
| nrofReportedRS | The number (N) of measured RS resources to be reported per report setting in a non-group-based report. N <= N__max, where N__max is either 2 or 4 depending on UE capability.<br>When the field is absent the UE applies the value 1. |
| nzp-CSI-RS-ResourcesForInterference | NZP CSI RS resources for interference measurement, csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement. |
| p0alpha | Index of the p0-alpha set determining the power control for this CSI report transmission. |
| pdsch-BundleSizeForCSI | PRB bundling size to assume for CQI calculation when reportQuantity is CRI/RI/i1/CQI. If the field is absent, the UE assumes that no PRB bundling is applied. |
| pmi-FormatIndicator | Indicates whether the UE shall report a single (wideband) or multiple (subband) PMI. |
| pucch-CSI-ResourceList | Indicates which PUCCH resource to use for reporting on PUCCH. |
| reportConfigType | Time domain behavior of reporting configuration. |
| reportFreqConfiguration | Reporting configuration in the frequency domain. |
| reportQuantity | The CSI related quantities to report. |
| reportSlotConfig | Periodicity and slot offset. If the field reportSlotConfig-v1530 is present, the UE shall ignore the value provided in reportSlotConfig (without suffix). |
| reportSlotOffsetList | Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so |

TABLE 6-continued

| CSI-ReportConfig Field Descriptions | |
|---|---|
| | on. The first report is transmitted in slot n + Y, second report in n + Y + P, where P is the configured periodicity. Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. |
| resourcesForChannelMeasurement | Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig. |
| subbandSize | Indicates one out of two possible BWP-dependent values for the subband size. If csi-ReportingBand is absent, the UE shall ignore this field. |
| timeRestrictionForChannelMeasurements | Time domain measurement restriction for the channel (signal) measurements. |
| timeRestrictionForInterferenceMeasurements | Time domain measurement restriction for interference measurements. |

TABLE 7

| PortIndexFor8Ranks Field Descriptions | |
|---|---|
| portIndex8 | Port-Index configuration for up to rank 8. If present, the network configures port indexes for at least one of the ranks. |
| portIndex4 | Port-Index configuration for up to rank 4. If present, the network configures port indexes for at least one of the ranks. |
| portIndex2 | Port-Index configuration for up to rank 2. If present, the network configures port indexes for at least one of the ranks. |
| portIndex1 | Port-Index configuration for rank 1. |

TABLE 8

| PUCCH-CSI-Resource Field Descriptions | |
|---|---|
| pucch-Resource | PUCCH resource for the associated uplink BWP. Only PUCCH-Resource of format 2, 3 and 4 is supported. The actual PUCCH-Resource is configured in PUCCH-Config and referred to by its ID. |

In some embodiments, Tables 9, 10, 11, 12, and 13 correspond to CSI resource configuration.

TABLE 9

| CSI ResourceConfig |
|---|
| The IE CSI-ResourceConfig defines a group of one or more NZP-CSI-RS-ResourceSet, CSI-IM-ResourceSet and/or CSI-SSB-ResourceSet. |

TABLE 10

CSI-ResourceConfig Information Element

```
-- ASN1START
-- TAG-CSI-RESOURCECONFIG-START
CSI-ResourceConfig ::=                SEQUENCE {
  csi-ResourceConfigId                  CSI-ResourceConfigId,
  csi-RS-ResourceSetList                CHOICE {
    nzp-CSI-RS-SSB                        SEQUENCE {
      nzp-CSI-RS-ResourceSetList            SEQUENCE (SIZE (1..maxNrofNZP-CSI-RS-
ResourceSetsPerConfig)) OF NZP-CSI-RS-ResourceSetId
OPTIONAL,   -- Need R
      csi-SSB-ResourceSetList               SEQUENCE (SIZE (1..maxNrofCSI-SSB-
ResourceSetsPerConfig)) OF CSI-SSB-ResourceSetId
OPTIONAL   -- Need R
    },
    csi-IM-ResourceSetList                SEQUENCE (SIZE (1...maxNrofCSI-IM-ResourceSetsPerConfig))OF
CSI-IM-ResourceSetId
  },
  bwp-Id                              BWP-id,
```

TABLE 10-continued

| CSI-ResourceConfig Information Element | |
|---|---|
| resourceType | ENUMERATED { aperiodic, semiPersistent, periodic }, |
| ... | |
| } | |
| -- TAG-CSI-RESOURCECONFIG-STOP | |
| -- ASN1STOP | |

TABLE 11

| CSI-ResourceConfig Field Descriptions | |
|---|---|
| bwp-Id | The DL BWP which the CSI-RS associated with this CSI-ResourceConfig are located in. |
| csi-IM-ResourceSetList | List of references to CSI-IM resources used for beam measurement and reporting in a CSI-RS resource set. Contains up to maxNrofCSI-IM-ResourceSetsPerConfig resource sets if resourceType is 'aperiodic' and 1 otherwise. |
| csi-ResourceConfigId | Used in CSI-ReportConfig to refer to an instance of CSI-ResourceConfig. |
| csi-SSB-ResourceSetList | List of references to SSB resources used for beam measurement and reporting in a CSI-RS resource set. |
| nzp-CSI-RS-ResourceSetList | List of references to NZP CSI-RS resources used for beam measurement and reporting in a CSI-RS resource set. Contains up to maxNrofNZP-CSI-RS-ResourceSetsPerConfig resource sets if resourceType is 'aperiodic' and 1 otherwise. |
| resourceType | Time domain behavior of resource configuration. It does not apply to resources provided in the csi-SSB-ResourceSetList. |

TABLE 12

| CSI-ResourceConfigID |
|---|
| The IE CSI-ResourceConfigId is used to identify a CSI-ResourceConfig. |

TABLE 13

| CSI-ResourceConfigID Information Element | |
|---|---|
| -- ASN1START | |
| -- TAG-CSI-RESOURCECONFIGID-START | |
| CSI-ResourceConfigId ::= | INTEGER (0..maxNrofCSI-ResourceConfigurations-1) |
| -- TAG-CSI-RESOURCECONFIGID-STOP | |
| -- ASN1STOP | |

In various embodiments, a CSI feedback framework may be updated via an RRC message. In such embodiments, RRC messages may have a large overhead and may incur a long delay. For high mobility UEs, such as a UE in a high speed environment, the UE may quickly travel through a coverage area of many cells and/or TRPs. In such embodiments, a gNB may configure many CSI resources for channel measurement and/or CSI resources for interference measurement using a CSI-ReportConfig transmitted via RRC. Accordingly, it may be less urgent for the gNB to update a CSI-Report configuration because there may be many resources configured and/or it may be up to the UE to conduct measurements and report selected CRI from the configured CSI-RS resources. However, such embodiments may use a large amount of overhead for UE measurements and/or computations.

In certain embodiments, using a MAC CE to update a CSI report configuration may facilitate quickly and/or easily updating control information between a gNB and a UE, and may use a low amount of overhead. Accordingly, a MAC CE may be used to update CSI resource indications in a CSI-ReportConfig. As may be appreciated, CSI resource indications that may be updated via a MAC CE include: resources for channel measurement (e.g., resourcesForChannelMeasurement); zero power CSI RS resources for interference measurement (e.g., csi-IM-ResourcesForInterference) (e.g., if configured in an original CSI-ReportConfig by RRC); and/or non-zero power CSI RS resources for interference measurement (e.g., nzp-CSI-RS_ResourcesForInterference) (e.g., if configured in the original CSI-ReportConfig by RRC).

In some embodiments, each of three types of resources (e.g., resources for channel measurement, zero power CSI RS resources for interference measurement, and non-zero power CSI RS resources for interference measurement) is indicated by a single identifier (e.g., CSI-ResourceConfigID). In such embodiments, updating the single identifier may be equivalent to updating the corresponding resources. In certain embodiments, a gNB may configure multiple CSI resource configurations and may update a CSI resource configuration used for channel measurement and/or a CSI resource configuration for interference measurement in a CSI report configuration using a MAC CE. In such embodiments, CSI resource configurations (e.g., CSI-ResourceConfig) may not be affected. Moreover, in such embodiments, other aspects of a CSI report, such as a report ID (e.g., reportConfigID), a carrier index (e.g., carrier), a CSI report type configuration (e.g., reportConfigType), a report quantity (e.g., reportQuantity), a CQI table (e.g., cqi-Table), a report frequency configuration (e.g., reportFreqConfiguration), a codebook configuration (e.g., codebookConfig), and/or a time restriction for channel and interference measurement (e.g., timeRestrictionForChannelMeasurements, timeRestrictionForinterferenceMeasurements) may not be affected.

As described above in relation to FIG. 5, a UE may travel through a series of TRPs (e.g., RRHs) with each TRP transmitting a corresponding CSI-RS. As may be appreciated, CSI-RS may be single CSI-RS resources or pairs of CSI-RS resources.

In one example, a UE may be configured with three CSI resource configurations: 1) CSI resource configuration CSI-ResourceConfig_0={CSI-RS-Set0}, CSI-RS-Set0={CSI-RS0}: CSI-IM for interference measurement; 2) CSI resource configuration CSI-ResourceConfig_1={CSI-RS-Set1}, CSI-RS-Set1={CSI-RS1, CSI-RS2}: CSI-RS for channel measurement; and 3) CSI resource configuration CSI-ResourceConfig_2: {CSI-RS-Set2}, CSI-RS-Set2={CSI-RS3, CSI-RS4}: CSI-RS for channel measurement. CSI-RS-Set0 is a CSI-IM resource set, and CSI-RS0 is a CSI-IM resource.

CSI-RS-Set1, and CSI-RS-Set2 are NZP-CSI-RS resource sets, and CSI-RS1, CSI-RS2, CSI-RS3, CSI-RS4 are different NZP-CSI-RS resources.

In this example, the UE is initially configured by RRC with a CSI report configuration shown in Table 14.

TABLE 14

| CSI Report Configuration 1 | |
|---|---|
| CSI-ReportConfig_1 ={ | |
| reportConfigId | 1 |
| ...... | |
| resourcesForChannelMeasurement | CSI-ResourceConfig_1 |
| csi-IM-ResourcesForInterference | CSI-ResourceConfig_0 |
| reportConfigType | periodic |
| ...... | |
| } | |

The resourcesForChannelMeasurement element of the CSI Report Configuration 1 of Table 14 may be updated using a MAC CE.

Continuing the example from above, a MAC CE for updating the CSI-ReportConfig shown in Table 14 contains the following information as shown in Table 15: 1) CSI-ReportConfig ID (e.g., reportConfigID) to identify a CSI Report Configuration to be updated (e.g., 1); 2) a CSI-ResourceConfig ID for channel measurement (e.g., resourcesForChannelMeasurement) (e.g., 2); and 3) a CSI-ResourceConfig ID for interference measurement (e.g., csi-IM-ResourcesForInterference) (e.g., 0).

After the UE receives this MAC CE and updates the CSI-ReportConfig, the CSI-ReportConfig_1 becomes what is shown in Table 15.

TABLE 15

| CSI Report Configuration 1 - Updated | |
|---|---|
| CSI-ReportConfig_1 ={ | |
| reportConfigId | 1 |
| ...... | |
| resourcesForChannelMeasurement | CSI-ResourceConfig_2 |
| csi-IM-ResourcesForInterference | CSI-ResourceConfig_0 |
| reportConfigType | periodic |
| ...... | |
| } | |

In this example, the only updated part of the CSI-ReportConfig 1 is the resourcesForChannelMeasurement (e.g., from CSI-ResourceConfig_1 to CSI-ResourceConfig_2). The same csi-IM-ResourcesForInterference is used. In response to receiving the MAC CE and after a predetermined time (e.g., specified time, configured time, signaled time), the UE may start measuring and computing CSI feedback based on CSI-ResourceConfig_2 for channel measurement and CSI-ResourceConfig_0 for CSI-IM interference measurement, and may send CSI feedback to the gNB in a configured PUCCH resource.

As described herein, a gNB may use a MAC CE to update a CSI report configuration of a UE, including a CSI resource setting for channel measurement, a CSI resource setting for CSI-IM, and/or a CSI resource setting for NZP CSI-RS for interference measurement. By using the MAC CE to update the CSI report configuration, a lower overhead may be used and/or a lower delay may occur as compared to updating the CSI report configuration using RRC. As may be appreciated, an ID of a CSI report configuration, a report type (e.g., periodic, semi-persistent, or aperiodic) and/or report resources and/or triggers may not change, so the same reporting resources may be reused. Accordingly, it may be easy for a gNB to reserve and trigger UL resources for a CSI report. Therefore, a CSI measurement and reporting process may be quickly updated as a UE moves in a network.

Figure 6:
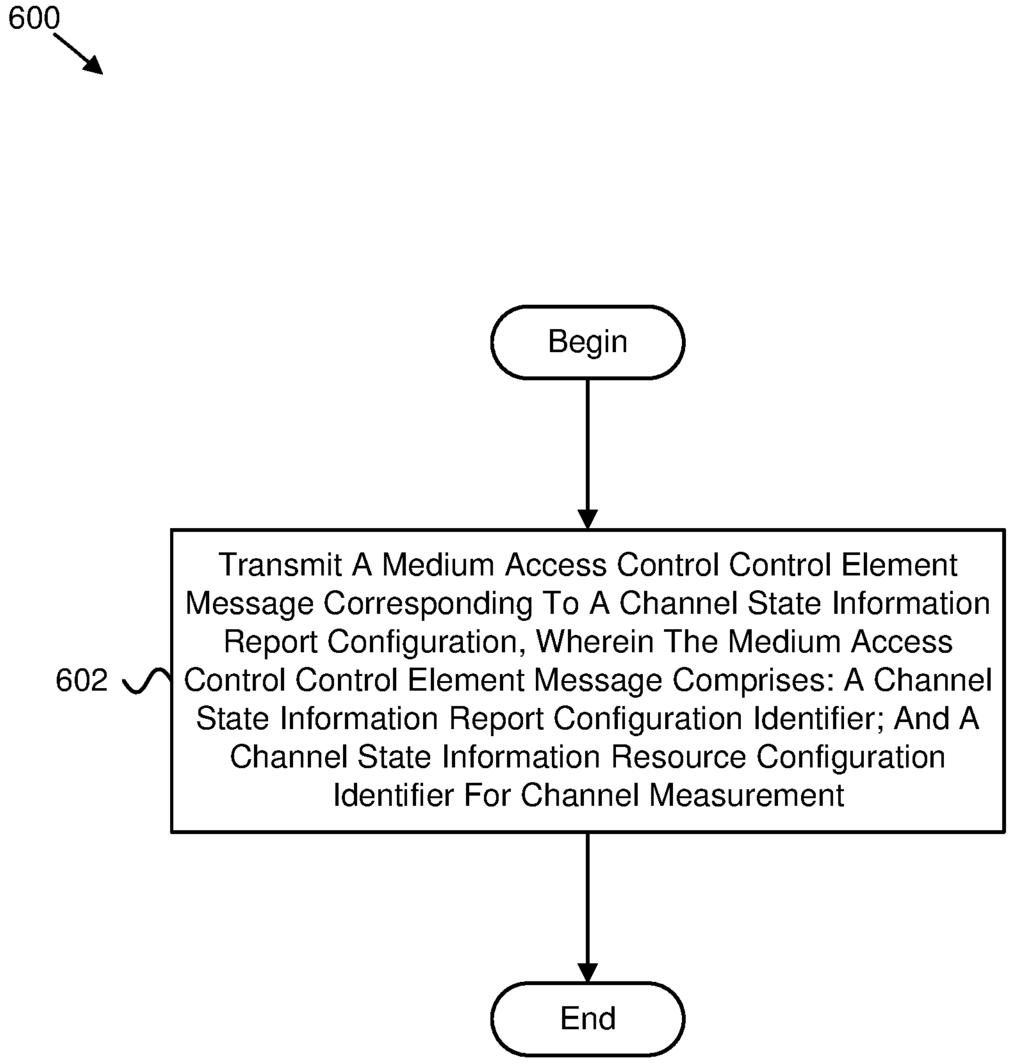
FIG. 6 is a schematic flow chart diagram illustrating one embodiment of a method for channel state information report configuration.

FIG. 6 is a schematic flow chart diagram illustrating one embodiment of a method 600 for channel state information report configuration. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 a medium access control control element message corresponding to a channel state information report configuration, wherein the medium access control control element message comprises: a channel state information report configuration identifier; and a channel state information resource configuration identifier for channel measurement.

In certain embodiments, the medium access control control element message comprises a channel state information interference measurement resource configuration identifier. In some embodiments, the medium access control control element message comprises a non-zero power channel state information resource configuration identifier for interference measurement.

In various embodiments, the method 600 further comprises receiving channel state information feedback determined based on the medium access control control element message. In one embodiment, the channel state information feedback is received after a predetermined time after receiving an acknowledgment corresponding to the medium access control control element message.

Figure 7:
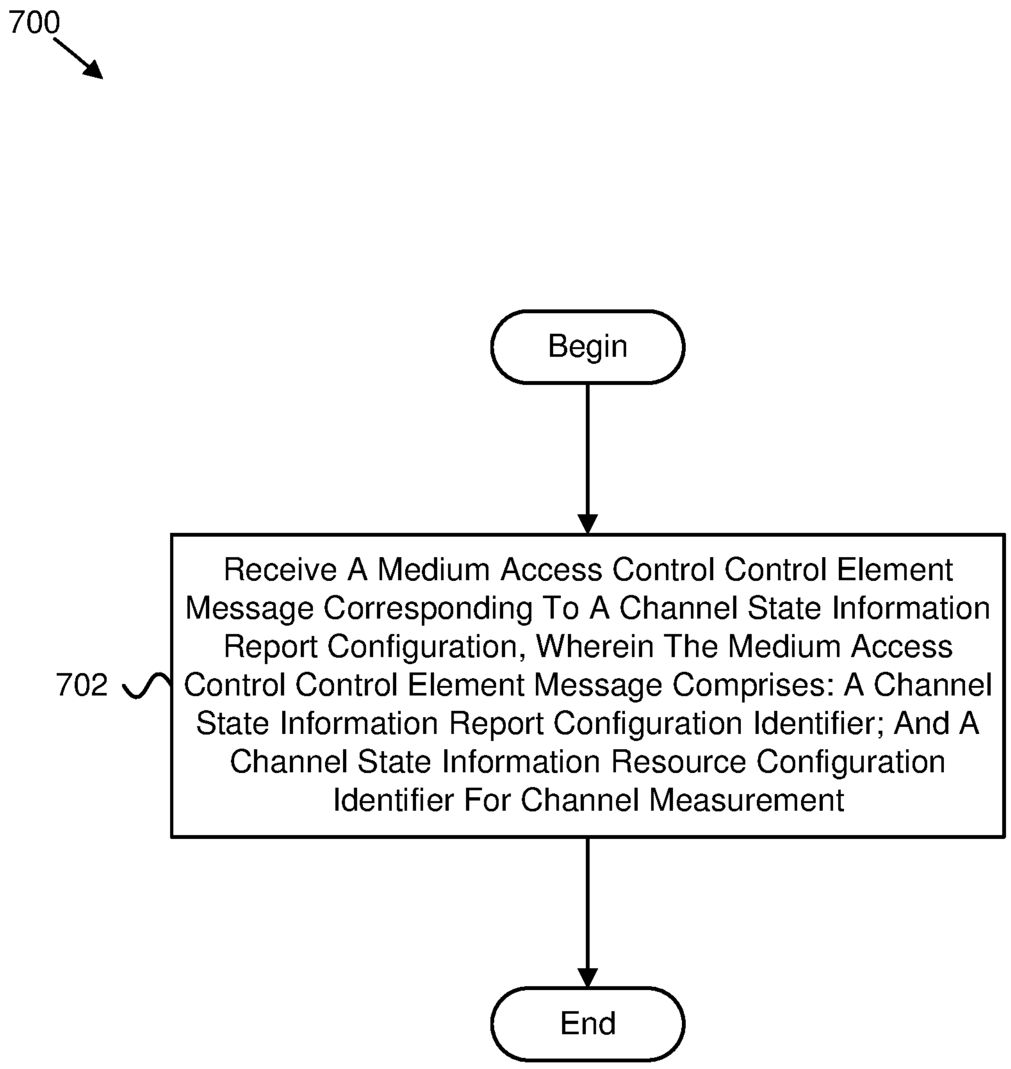
FIG. 7 is a schematic flow chart diagram illustrating another embodiment of a method for channel state information report configuration.

FIG. 7 is a schematic flow chart diagram illustrating one embodiment of a method 700 for channel state information report configuration. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a medium access control control element message corresponding to a channel state information report configuration, wherein the medium access control control element message comprises: a channel state information report configuration identifier; and a channel state information resource configuration identifier for channel measurement.

In certain embodiments, the medium access control control element message comprises a channel state information interference measurement resource configuration identifier. In some embodiments, the medium access control control element message comprises a non-zero power channel state information resource configuration identifier for interference measurement.

In various embodiments, the method 700 further comprises performing measurements based on the medium access control control element message. In one embodiment, the method 700 further comprises transmitting channel state information feedback determined based on the medium access control control element message. In certain embodiments, the channel state information feedback is transmitted after a predetermined time after transmitting an acknowledgment for the medium access control control element message.

In one embodiment, a method comprises: transmitting a medium access control control element message corresponding to a channel state information report configuration, wherein the medium access control control element message comprises: a channel state information report configuration identifier; and a channel state information resource configuration identifier for channel measurement.

In certain embodiments, the medium access control control element message comprises a channel state information interference measurement resource configuration identifier.

In some embodiments, the medium access control control element message comprises a non-zero power channel state information resource configuration identifier for interference measurement.

In various embodiments, the method further comprises receiving channel state information feedback determined based on the medium access control control element message.

In one embodiment, the channel state information feedback is received after a predetermined time after receiving an acknowledgment corresponding to the medium access control control element message.

In one embodiment, an apparatus comprises: a transmitter that transmits a medium access control control element message corresponding to a channel state information report configuration, wherein the medium access control control element message comprises: a channel state information report configuration identifier; and a channel state information resource configuration identifier for channel measurement.

In certain embodiments, the medium access control control element message comprises a channel state information interference measurement resource configuration identifier.

In some embodiments, the medium access control control element message comprises a non-zero power channel state information resource configuration identifier for interference measurement.

In various embodiments, the apparatus further comprises a receiver that receives channel state information feedback determined based on the medium access control control element message.

In one embodiment, the receiver receives the channel state information feedback after a predetermined time after receiving an acknowledgment corresponding to the medium access control control element message.

In one embodiment, a method comprises: receiving a medium access control control element message corresponding to a channel state information report configuration, wherein the medium access control control element message comprises: a channel state information report configuration identifier; and a channel state information resource configuration identifier for channel measurement.

In certain embodiments, the medium access control control element message comprises a channel state information interference measurement resource configuration identifier.

In some embodiments, the medium access control control element message comprises a non-zero power channel state information resource configuration identifier for interference measurement.

In various embodiments, the method further comprises performing measurements based on the medium access control control element message.

In one embodiment, the method further comprises transmitting channel state information feedback determined based on the medium access control control element message.

In certain embodiments, the channel state information feedback is transmitted after a predetermined time after transmitting an acknowledgment for the medium access control control element message.

In one embodiment, an apparatus comprises: a receiver that receives a medium access control control element message corresponding to a channel state information report configuration, wherein the medium access control control element message comprises: a channel state information report configuration identifier; and a channel state information resource configuration identifier for channel measurement.

In certain embodiments, the medium access control control element message comprises a channel state information interference measurement resource configuration identifier.

In some embodiments, the medium access control control element message comprises a non-zero power channel state information resource configuration identifier for interference measurement.

In various embodiments, the apparatus further comprises a processor that performs measurements based on the medium access control control element message.

In one embodiment, the apparatus further comprises a transmitter that transmits channel state information feedback determined based on the medium access control control element message.

In certain embodiments, the transmitter transmits the channel state information feedback after a predetermined time after transmitting an acknowledgment for the medium access control control element message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising: transmitting a medium access control control element (MAC CE) message corresponding to update a channel state information (CSI) report configuration, wherein the MAC CE message comprises: a (CSI) CSI report configuration identifier (ID) that identifies the CSI report configuration to be updated; a CSI resource configuration ID for channel measurement; and a CSI interference measurement (IM) resource configuration ID.

2. The method of claim 1, wherein the MAC CE message comprises a non-zero power (NZP) CSI resource configuration ID for interference measurement (IM).

3. The method of claim 1, further comprising receiving CSI feedback determined based on the MAC CE message.

4. The method of claim 3, wherein the CSI feedback is received after a predetermined time after receiving an acknowledgment corresponding to the MAC CE message.

5. A base station, comprising:
at least one memory; and
at least one processor coupled with the at least one memory and configured to cause the base station to:
transmit a medium access control control element (MAC CE) message to update a channel state information (CSI) report configuration, wherein the MAC CE message comprises:
a CSI report configuration identifier (ID) that identifies the CSI report configuration to be updated;
a CSI resource configuration ID for channel measurement; and
a CSI interference measurement (IM) resource configuration ID.

6. The base station of claim 5, wherein the MAC CE message comprises a non-zero power (NZP) CSI resource configuration ID for interference measurement (IM).

7. The base station of claim 5, wherein the at least one processor is configured to cause the base station to receive CSI feedback determined based on the MAC CE message.

8. The base station of claim 7, wherein the at least one processor is configured to cause the base station to receive CSI feedback after a predetermined time after receiving an acknowledgment corresponding to the MAC CE message.

9. A user equipment (UE), comprising:
at least one memory; and
at least one processor coupled with the at least one memory and configured to cause the UE to:
receive a medium access control control element (MAC CE) message to update a channel state information (CSI) report configuration, wherein the MAC CE message comprises:
a CSI report configuration identifier (ID) that identifies the CSI report configuration to be updated;
a CSI resource configuration ID for channel measurement; and
a CSI interference measurement (IM) resource configuration ID.

10. The UE of claim 9, wherein the MAC CE message comprises a non-zero power (NZP) CSI resource configuration ID for interference measurement (IM).

11. The UE of claim 9, wherein the at least one processor is configured to cause the UE to perform measurements based on the MAC CE message.

12. The UE of claim 9, wherein the at least one processor is configured to cause the UE to transmit CSI feedback determined based on the MAC CE message.

13. The UE of claim 12, wherein the at least one processor is configured to cause the UE to transmit CSI feedback after a predetermined time after transmitting an acknowledgment for the MAC CE message.

14. A method performed by a user equipment (UE), the method comprising:
receiving a medium access control control element (MAC CE) message to update a channel state information (CSI) report configuration, wherein the MAC CE message comprises:
a CSI report configuration identifier (ID) that identifies the CSI report configuration to be updated;
a CSI resource configuration ID for channel measurement; and
a CSI interference measurement (IM) resource configuration ID.

15. The method of claim 14, wherein the MAC CE message comprises a non-zero power (NZP) CSI resource configuration ID for interference measurement (IM).

16. The method of claim 14, further comprising performing measurements based on the MAC CE message.

* * * * *